United States Patent [19]

Ringe

[11] Patent Number: 4,634,144
[45] Date of Patent: Jan. 6, 1987

[54] SAND SHOE

[75] Inventor: Stephen J. Ringe, Farmington, Mich.

[73] Assignee: Fruehauf Corporation, Detroit, Mich.

[21] Appl. No.: 794,196

[22] Filed: Nov. 1, 1985

[51] Int. Cl.[4] .............................................. B60S 9/00
[52] U.S. Cl. .................. 280/763.1; 16/42 T; 248/188.9; 248/352; 254/419; 254/DIG. 1
[58] Field of Search ............... 280/763.1, 764.1, 765.1, 280/766.1, 475; 16/42 T; 248/188.9, 352, 357; 254/DIG. 1, 418, 419; 212/189

[56] References Cited

U.S. PATENT DOCUMENTS 3,666,290  5/1972  Dalton et al. .................... 280/763.1
4,462,612  7/1984  Dreyer et al. .................... 248/352

Primary Examiner—John A. Pekar
Attorney, Agent, or Firm—Ralph J. Skinkiss; David L. Kuhn

[57] ABSTRACT

Disclosed herein is a landing gear assembly having legs extending downward from the underframe of a trailer and having a sand shoe at the ground engaging end thereof. The shoe is articulately joined to the ground engaging end of the leg by a collar circumscribing the ground engaging end of the leg. Compressed between the base of the leg and the bottom of the shoe is a wedge-shaped resilient member biasing the shoe into a tilted position relative to the plate.

4 Claims, 8 Drawing Figures

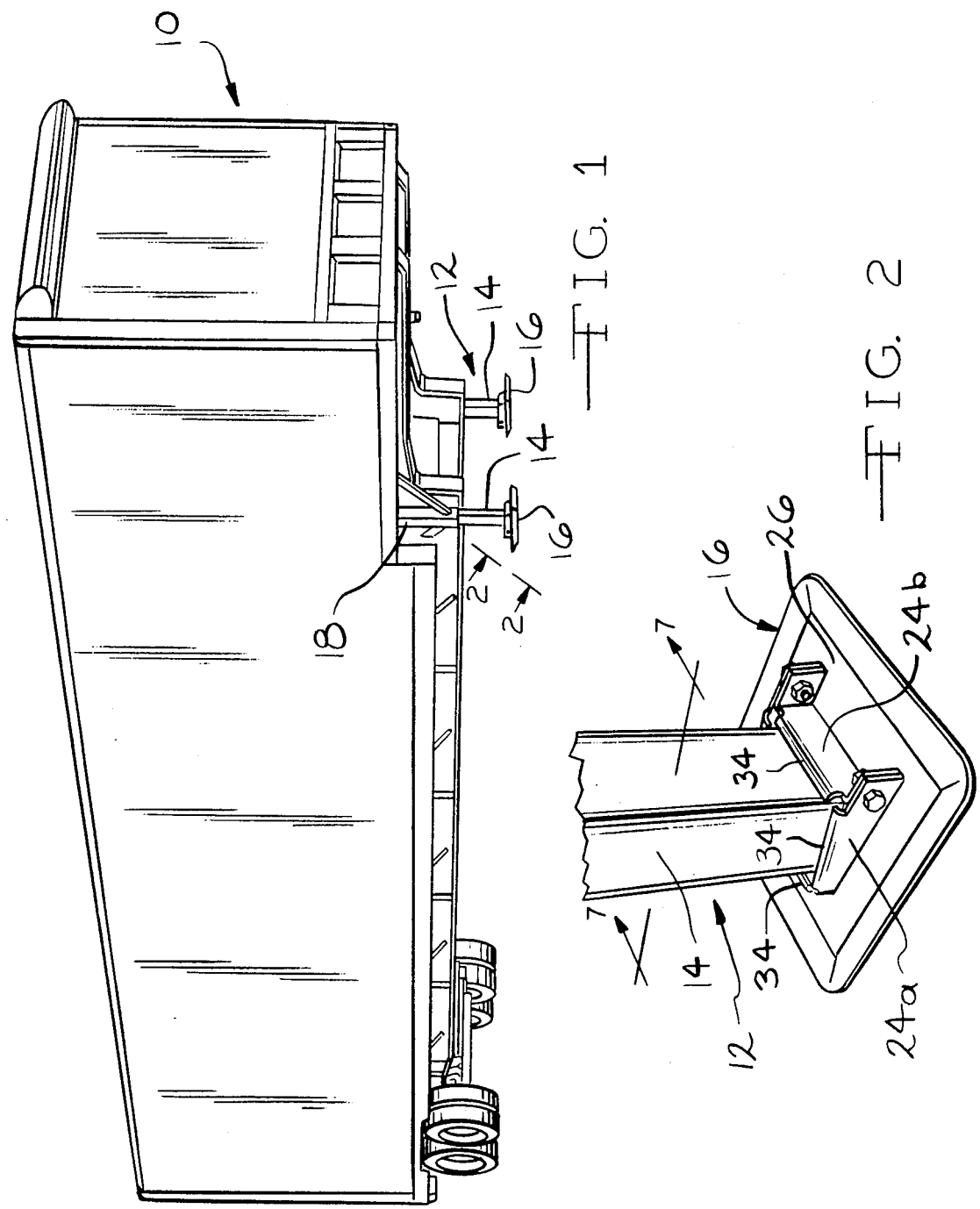

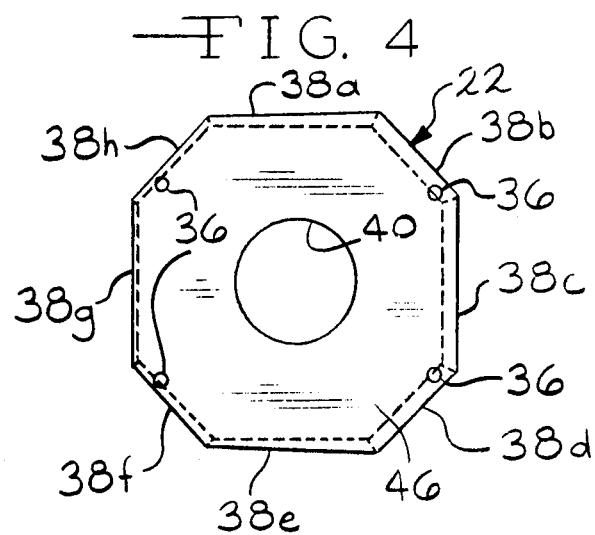
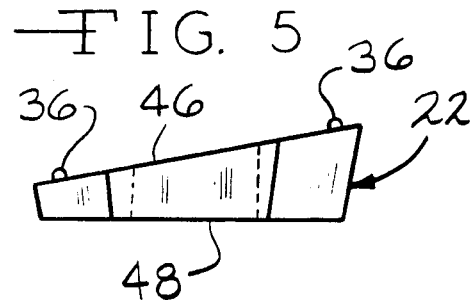
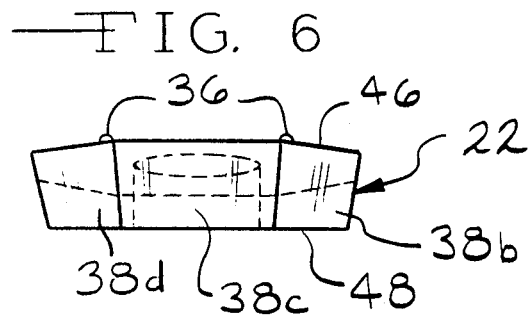
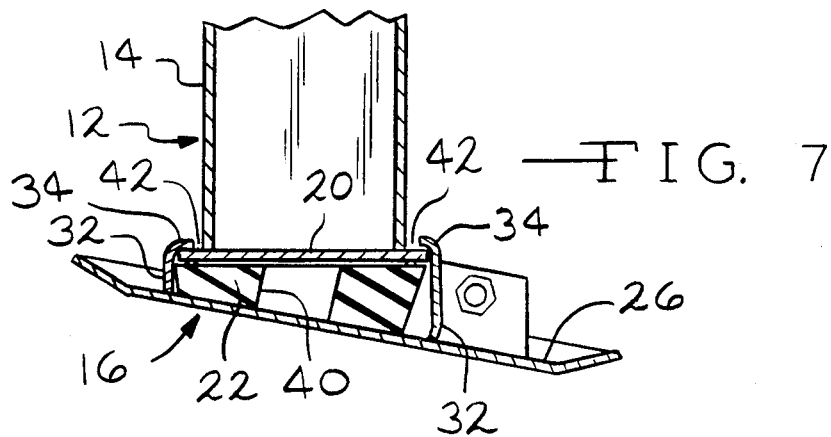
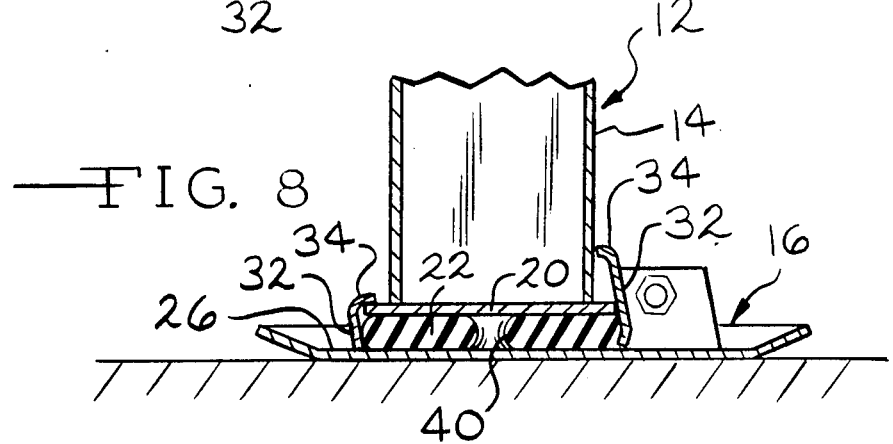

SAND SHOE

BACKGROUND OF THE INVENTION

This invention relates to landing gear for trailers and more particularly relates to the structure of a landing gear sand shoe.

Landing gear for trailers are often subjected to sudden vertical shock forces and to horizontal load forces. A vertical shock force typically occurs when a trailer is uncoupled from a tractor and the forward end of the trailer is dropped to the ground upon its landing gear. Horizontal loads upon the landing gear occur when a tractor pushes against the trailer during coupling. The horizontal coupling forces tend to move the landing gear legs horizontally relative to the sand shoes possibly damaging the shoes or even shearing the shoes from the legs. One solution to this problem is provided by Dalton, U.S. Pat. No. 3,666,290 which teaches a rubber toroid disposed between the base of a round strut and a horizontally disposed foot plate, the toroid being encircled by a skirt congruently fit to the strut to prevent horizontal forces from shearing the toroid.

However, vertically retractable landing gear pose a problem not solved by Dalton. In such landing gear, the legs extend part way to the ground in the retracted condition, and the sand shoes often strike objects over which the trailer passes. It is thus advantageous to have sand shoes whose bottom surfaces are, upon landing gear retraction, tilted upward at the front edge rather than horizontally disposed as taught by Dalton. It has been found that an upwardly tilted sand shoe is less likely to snag upon objects passing beneath the trailer when the trailer is moved forward and that the tilted bottom surface of a landing gear shoe will often deflect objects striking the foot plate from a forward direction.

SUMMARY OF THE INVENTION

My invention comprises a tiltable landing gear sand shoe joined to the bottom of a landing gear leg. Within the shoe and compressed between the base plate of the leg and the ground engaging skid tray of the shoe is a wedge-like shock absorbing cushion biasing the skid tray toward the desirable tilted position in which the leading edge of the tray is higher than the trailing edge of the tray.

A further advantageous feature of my sand shoe is a means to quickly attach the shoe to, or release the shoe from, the landing gear leg. In this way damaged shoes can be quickly replaced with minimal inconvenience and labor costs.

BRIEF DESCRIPTION OF THE DRAWINGS

FIG. 1 is a perspective view of a trailer having my improved sand shoe.

FIG. 2 is an enlarged perspective view taken along line 2—2 in FIG. 1 of the landing gear sand shoe.

FIG. 4 is a plan view of the elastomeric cushion housed by the landing gear shoe.

FIG. 5 is a side elevational view of the cushion shown in FIG. 4.

FIG. 6 is an end elevational view of the cushion shown in FIG. 4.

FIG. 7 is a cross-sectional view of the landing gear leg and shoe taken along line 7—7 of FIG. 2 showing the shoe and cushion in an unloaded condition.

FIG. 8 is a cross-sectional view of the landing gear leg and shoe similar to that in FIG. 7 showing the shoe and cushion in the loaded condition.

DETAILED DESCRIPTION

Figure 3:
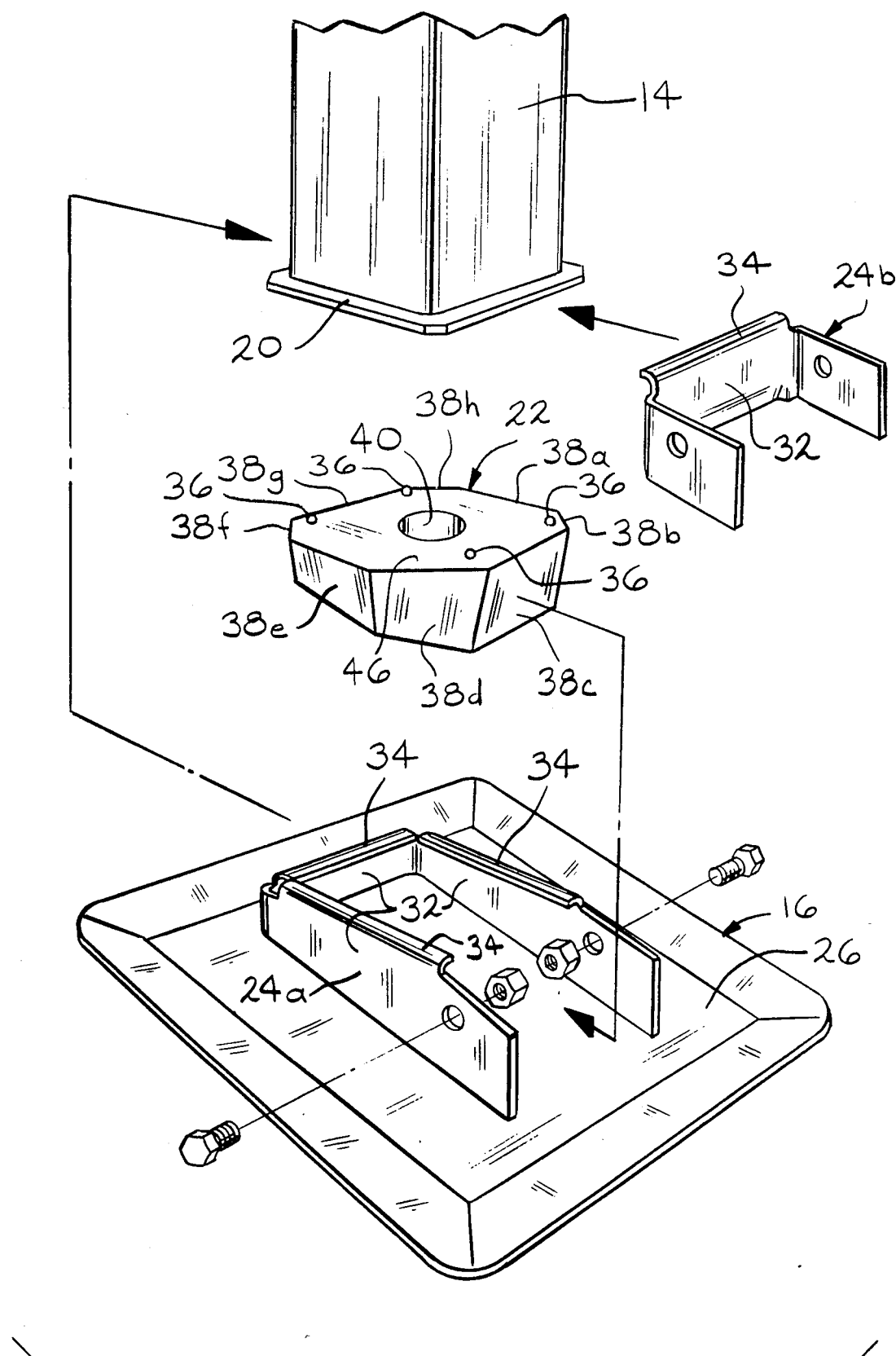
FIG. 3 is an exploded perspective view of the sand shoe shown in FIGS. 1 and 2.

In FIG. 1 is shown a typical trailer 10 having a landing gear assembly 12 including legs 14 at the base of which sand shoes 16 are attached. Landing gear assembly 12 is typically a telescoping landing gear wherein leg 14 translates vertically into and from sheath 18 affixed to the bottom of trailer 10.

Referring now to FIGS. 2 and 3, leg 14 is typically a cross-sectionally square steel tube. At the base of leg 14 is welded a flat plate 20 generally perpendicular to the longitudinal axis of leg 14. Plate 20 overlaps the cross-section of leg 14 so that the edges of plate 20 extend away from leg 14 on all four sides. Preferably the corners of plate 20 are beveled and the periphery of plate 20 is smoothed so that plate 20 has no sharp edges or points to puncture or cut elastomeric cushion 22 against which plate 20 bears.

Forming an articulate joint with leg 14 and plate 20 is shoe 16 which includes a restriction collar comprising U-shaped section 24a and closure member 24b attached to ground engaging skid tray 26. U-shaped section 24a of the restriction collar preferably welded at the bottom of its three walls to skid tray 26 but closure section 24b is not affixed to skid tray 26 so that closure member 24b can be unbolted and removed from the shoe 16 to permit removal of sand shoe 16 from leg 14.

As can be seen in conjunction with FIGS. 2, 7 and 8, the four sides of restriction collar comprise walls 32 having flanges 34 extending inwardly from wall 32 toward leg 14 to form a square opening smaller in width than plate 20 and larger in width than leg 14. Flanges 34 lie above the peripheral edges of plate 20 so that plate 20 prevents the collar and thus sand shoe 16, from falling off leg 14. The peripheral gap 42 between exterior girth of leg 14 and the inner edges of flanges 34 allow the shoe to be tilted between 5 and 15 degrees and preferably 10 degrees in any direction with respect to plate 20 before one of flanges 34 abuts the side of leg 14. Thus, when landing gear assembly 12 rests upon the ground, shoes 16 tilt to adapt themselves to uneven or slanted ground surfaces. The width of peripheral gap 42 is dimensioned so as to allow the desired amount of shoe tiltability.

As seen in FIGS. 3, 7 and 8, a shock absorbing elastomeric cushion 22 is positioned between plate 20 and skid tray 26. Cushion 22 may have a Shore A durometer reading of between 55 and 65 and is preferably 60. It has been found that cushions having durometers between 55 and 65 Shore A provide the most desirable shock absorption qualities to reduce the effects of sudden vertical impacts on the landing gear assembly 12. As seen in FIGS. 4 and 5, elastomeric cushion 22 has a generally octagonal shape and has a longitudinal cross-section in the form of a truncated wedge. Conveniently positioned on the top of elastomeric cushion 20 are four feet 36. The purpose of feet 36 is to facilitate installation of shoes 16 onto leg 14. Before installation of shoe 16 onto leg 14, the U-shaped collar section 24a is welded onto skid tray 26 of shoe 16. Cushion 22 is then placed feet up on skid tray 26 within U-shaped portion 24a. Shoe 16 is then slid onto leg 14, the flanges 34 on the arms of U-shaped collar section 24a riding upon opposite edges of plate 20. While shoe 16 is sliding onto leg 14, upward pressure is maintained on shoe 16 to compress cushion 22 so that cushion 22 will fit between skid tray 26 and plate 20. Feet 36 take up the compression of cushion 22 as shoe 16 slides onto leg 14. Since feet 36 have a much smaller cross-sectional area and consequent smaller resistance to compression than does the bulk of cushion 22, less upward force upon shoe 16 is required to slide shoe 16 onto leg 14 than if feet 36 were not present. In addition, feet 36 provide a smaller frictional engagement surface bearing against plate 20 as shoe 16 is slid onto leg 14 than would plate engaging face 46 of cushion 22 if feet 36 were not present. Thus feet 36 reduce the frictional resistance between cushion 22 and plate 20 as shoe 16 slides onto leg 14. Although the structure of feet 36 is preferred, it should be recognized that the function of feet 36 could be accomplished by any suitable projections from plate engaging face 46 of cushion 22 having a small cross-sectional area as compared to the bulk of cushion 22 lying between plate engaging face 46 and tray engaging face 48.

When elastomeric cushion 22 is not under compressive load from trailer 10 as shown in FIG. 8, elastomeric cushion 22 is under a relatively slight compressive pre-load between plate 20 and skid tray 26 such that feet 36 are deformed. As shown in FIG. 7, cushion 22 in a pre-load condition resiliently bears against plate 20 and skid tray 26 so that skid tray 20 is held at an acute angle with respect to a horizontal plane. The rear edge of skid tray 26 is beneath the thicker end of elastomeric cushion 22 and is tilted downward while the front edge of skid tray 26 is beneath the thinner end of elastomeric cushion 22 and is tilted upward.

Elastomeric cushion 22 has features to increase its spring rate or resistance to compression as the compressive load transmitted to cushion 22 from trailer 10 increases. First, cushion 22 has a wedge shaped or inclined-plane shaped longitudinal cross-section and is also tapered about its periphery from top to bottom. The shape of cushion 22 thereby causes an increasingly greater cross-section of cushion 22 to resist compression of cushion 22 as the vertical load upon cushion 22 increases until cushion 22 reaches the fully compressed state shown in FIG. 8. Second, alternate octagon faces 38a, 38c, 38e and 38f face respective wall segments 32 of U-shaped section 24a and closure section 24b of the restriction collar. When cushion 22 expands horizontally under compressive loading transferred through plate 20, octagon faces 38a, 38c, 38e and 38f contact wall segments 32 and receive lateral support from therefrom. As cushion 22 is further compressed and expands further horizontally, increasing surface areas of octagon faces 38a, 38c, 38e and 32f contact the respective walls 32 and thus receive increasing lateral support from the walls so that cushion 22 has increased spring rate to resist compression as compressive forces increase in magnitude.

It should be noted that not all expansion of cushion 22 under load is restricted. Aperture 40 in elastomeric cushion 22 centered with respect to octagon sides 38a through 38h permits horizontal expansion of a portion of cushion 22. In addition, octagon faces 38b, 38d, 38f and 38h do not parallel the opposing walls of the restriction collar and thereby are permitted to expand into the corners of the restriction collar. If cushion 22 were not permitted to expand horizontally as it is compressed vertically, cushion 22 would lose elasticity and would have an excessive spring rate. Thus the aperture 40 and the empty corners of the restriction collar prevent cushion 22 from stiffening to an undesirably high spring rate by providing a volume into which cushion 22 can expand when cushion 22 is compressed. While cushion 22 is shown in the preferred configuration herein, it will be recognized that cushion 22 may be modified in shape so long as sufficient volume in shoe 16 is provided to permit lateral expansion of cushion 22 when cushion 22 is compressed.

It should be further noted that deformation of elastomeric cushion 22 due to shear forces acting upon cushion 22 is limited by restriction collar of shoe 16. Horizontal forces acting on leg 14 or shoe 16 during, for example, coupling of trailer 10 to a tractor unit (not shown) can cause relative lateral movement between shoe 16 and leg 14 and thus cause a shear stressing of elastomeric cushion 22. However, the aforesaid horizontal forces can only cause relative lateral movement between leg 14 and shoe 16 until one of flanges 34 of shoe 16 abuts with one side of leg 14. At this point a flange 34 of shoe 16 resists further relative lateral movement between shoe 16 and leg 14, thereby preventing further shear stressing of cushion 22.

While the above description presents the preferred embodiment of my invention, it is recognized that a number of modifications to my invention may occur to those skilled in the relevant art which may fall within the scope of the following claims.

What is claimed is:

1. A landing gear for vertically supporting one end of a trailer comprising:
    a leg mounted at one end of said trailer;
    a plate fastened at the other end of said leg having peripheral edges extending laterally away from said leg;
    a restriction collar girding said leg and said plate defining an opening smaller than said plate whereby said plate retains said restriction collar upon said leg;
    a ground engagement member comprising a skid tray fixed to said collar and opposing said leg plate;
    a resilient body having a skid tray engaging face oriented at an acute angle relative to a plate engaging face, said resilient body circumscribed by said restriction collar and being under compression between said leg plate and said skid tray, whereby said skid tray is resiliently held at an acute angle with respect to said leg plate.

2. The landing gear of claim 1 wherein said resilient body has edge faces between said tray engaging face and said plate engaging face, said edge faces opposed by inner peripheral surfaces of said restriction collar, the horizontal expansion of said resilient body at said edge faces during vertical compression of said body being limited by said inner peripheral surfaces of said restriction collar.

3. The landing gear of claim 2 wherein a portion of said restriction collar is removably attached to said collar, whereby said collar and said skid tray can be detached from said leg upon removal of said collar portion.

4. The device of claim 3 wherein said collar defines with said leg a gap about the girth of said leg, whereby said skid tray is tiltably articulable with respect to said leg.

* * * * *